UNITED STATES PATENT OFFICE.

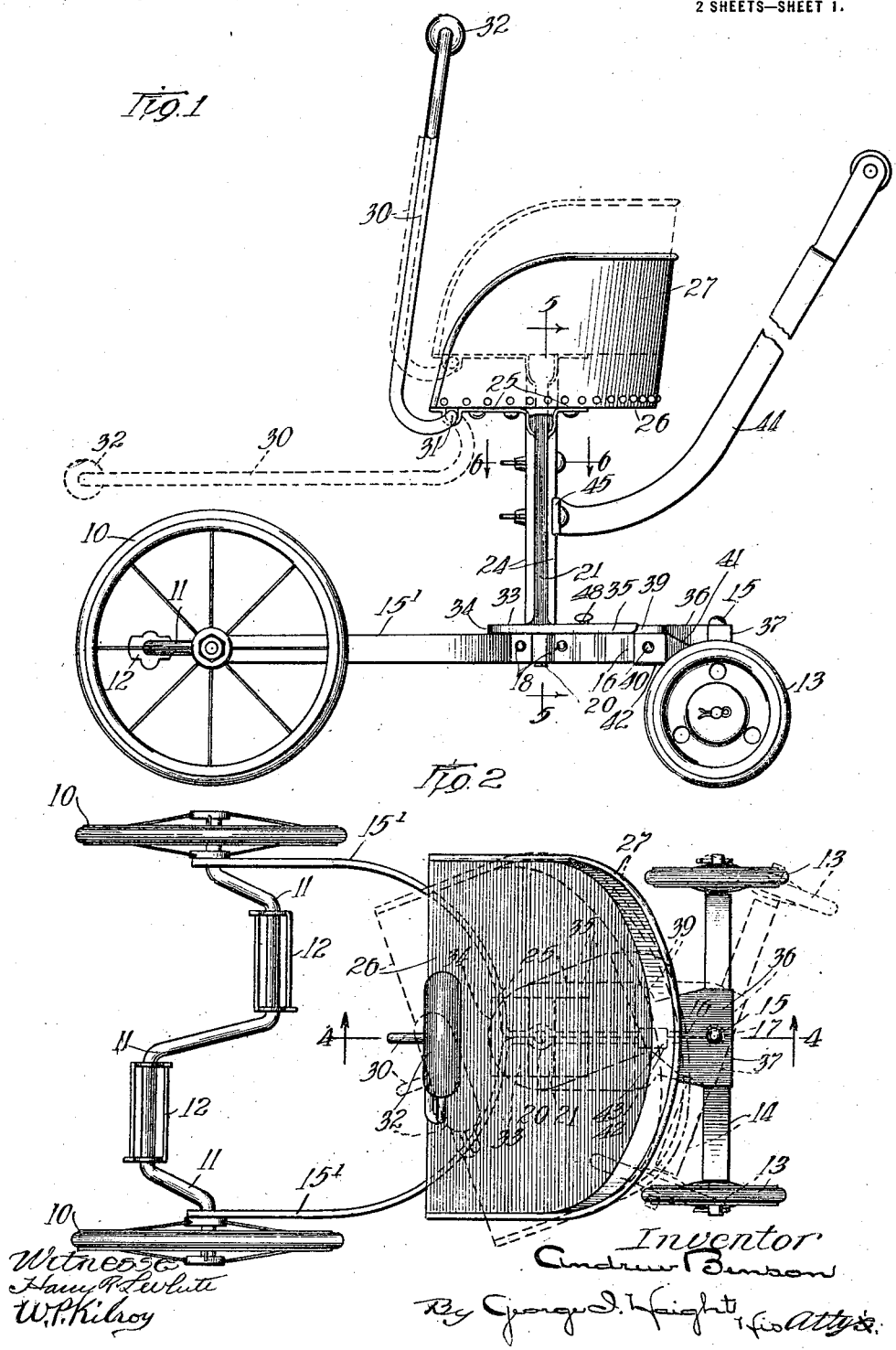

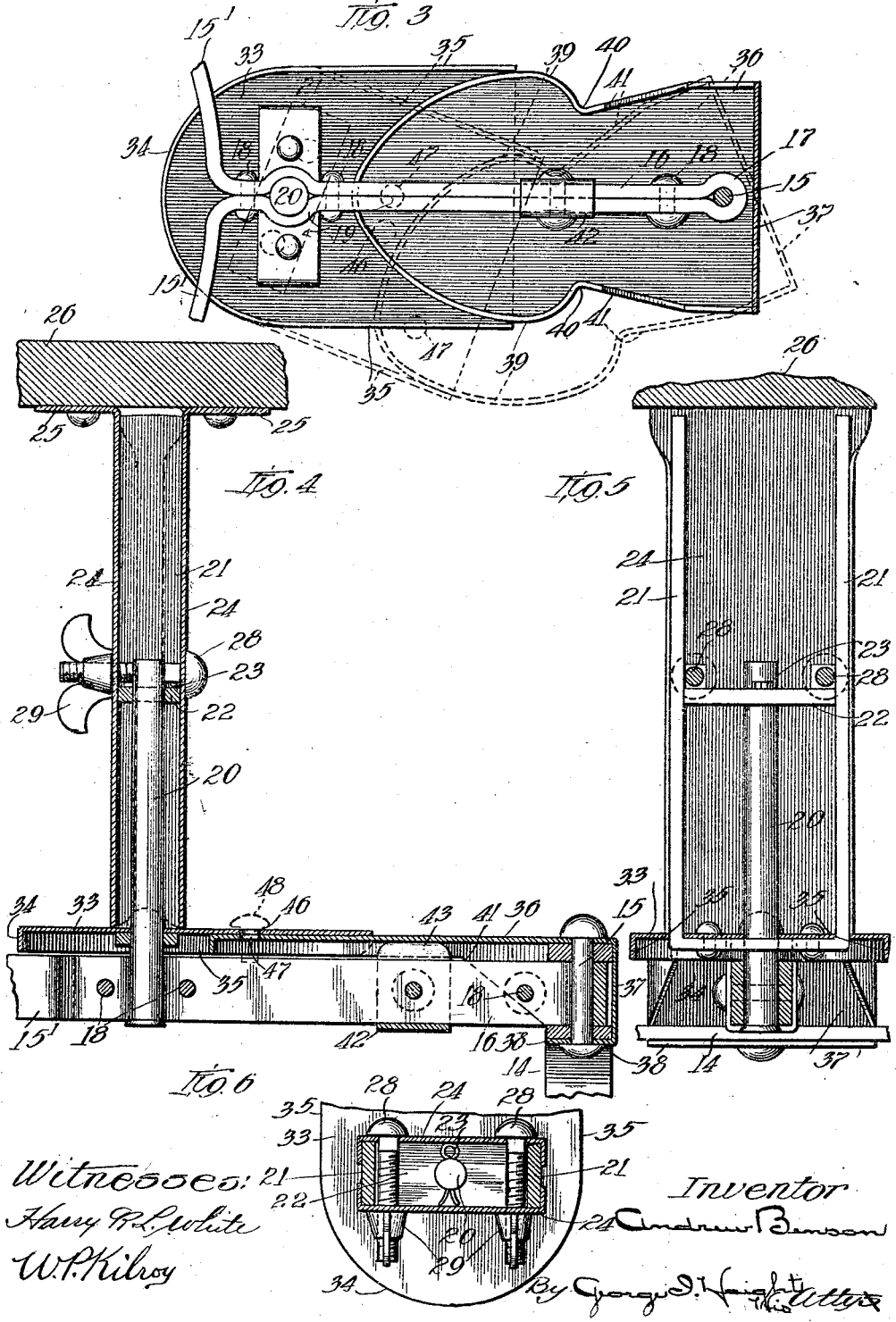

ANDREW BENSON, OF CHICAGO, ILLINOIS, ASSIGNOR TO JANESVILLE PRODUCTS COMPANY, OF JANESVILLE, WISCONSIN, A CORPORATION OF WISCONSIN.

COMBINED VELOCIPEDE AND GO-CART.

1,288,809.   Specification of Letters Patent.   Patented Dec. 24, 1918.

Application filed May 5, 1916. Serial No. 95,538.

*To all whom it may concern:*

Be it known that I, ANDREW BENSON, a citizen of the United States, residing at Chicago, in the county of Cook and State of Illinois, have invented a certain new and useful Improvement in Combined Velocipedes and Go-Carts, of which the following is a full, clear, concise, and exact description, reference being had to the accompanying drawings, forming a part of this specification.

This invention relates to improvements in a combined velocipede and go-cart.

One object of the invention is to provide a velocipede for small children which is particularly adapted for indoor use and so arranged that it can be easily propelled by a child and steered by moving the seat.

Another object of the invention is to provide a velocipede of the above indicated character which is light in weight, yet strong and durable, which may be cheaply manufactured and which is composed in greater part of stamped and bent metal to thereby minimize manufacturing costs.

Another object of the invention is to so construct and arrange the parts that the velocipede may be turned on curves of comparatively short radius.

A still further object of the invention is to provide a velocipede of the type above indicated which may be easily and quickly converted for use as a go-cart.

In the drawing forming a part of this specification, Figure 1 is a side elevation of a structure embodying my improvements, the dotted lines indicating adjusted positions of the seat and grip lever. Fig. 2 is a top plan view of the structure illustrated in Fig. 1, the dotted positions of the rear set of wheels and seat indicating the method of steering. Fig. 3 is a bottom plan view, upon an enlarged scale, of a portion of the frame work and illustrating more particularly the mechanism for effecting the steering. Fig. 4 is a vertical sectional view, upon an enlarged scale, taken on the line 4—4 of Fig. 2. Fig. 5 is a vertical section, upon an enlarged scale, taken at right angles to the section of Fig. 4 and on the line 5—5 of Fig. 1. And Fig. 6 is a detailed horizontal section taken on the line 6—6 of Fig. 1.

The velocipede is provided with a front set of rubber tired propelling wheels 10—10 mounted on a shaft having cranks 11—11, the latter being provided with suitable stamped metal pedals 12—12. At its rear end, the velocipede is provided with a set of smaller, rubber tired steering wheels 13—13 mounted on a rigid, transversely extending bolster 14 pivotally connected at its center by means of a king pin 15 to the frame work of the car. Said frame work comprises a bar of metal bent to form a fork, the arms 15'—15' of which are carried by the axle of the front pair of wheels, said bar being doubled upon itself as indicated at 16—16 and at its extreme rear end forming a bearing 17 for said king pin 15. Where the bar is doubled upon itself, it is suitably fastened together as by rivets 18—18 and near the beginning of the forked portion, said bar is bent as indicated at 19 to form a bearing for a post 20. Carried by said post 20 is an upwardly extending U-shaped member 21, the arms of which are braced intermediate their ends as indicated at Fig. 5, by a cross bar 22 also carried by said post 20 and held in position by any suitable means such as a cotter 23. The U-shaped member 21 has vertically adjustably mounted thereon two opposed stamped plates 24—24 of substantially channel cross section with their flanges fitting over the arms of said member 21. Said plates 24 are provided at their upper ends with oppositely extended horizontal flanges 25—25 screwed or otherwise suitably secured to the bottom 26 of a seat having a sheet metal side and back 27. The members 24—24 are provided with two pairs of alined perforations through which are extended bolts 28—28, the latter passing between the arms of said member 21 and being provided on their outer ends with tightening wing nuts 29. From the foregoing description, it will be seen that the seat may be adjusted vertically to any desired height by merely loosening the nuts on the bolts and then tightening them when the seat has been adjusted to the proper height. A lever or arm 30 is pivoted to the underside of the seat as indicated at 31, said lever having a grip handle 32 arranged in convenient position for the child. The lever 30 is preferably located centrally of the seat so that the child may straddle the same.

Fitting over the post 20 and the U-shaped member 21 and rigid with respect thereto is a horizontal sheet metal plate 33 having a flange extending around the sides thereof, the front portion thereof being curved as indicated at 34 and the sides extending parallelly as indicated at 35—35. The plate 33 fits over and coöperates with another horizontally arranged stamped plate 36, rigidly secured to the rear cross bar 14, said plate 36 having its rear portion extended downwardly as indicated at 37 and again forwardly as indicated at 38 and secured to the rear frame work 14 by the king pin 15 which is in the form of a rivet headed at both ends. The plate 36 is of substantially gear tooth shape at its forward end as indicated at 39 and has a restricted section as indicated at 40 from which extend rearwardly the outwardly flaring sides 41—41 toward the rear end. As will be understood, the plate 36 is provided with a depending flange around its perimeter which not only strengthens it, but is adapted to coöperate with the depending flange on the other plate 33. The portion 16—16 of the bar forming the supporting frame is provided with an upwardly extending U-shaped clip 42, the upper ends 43—43 of which are so disposed as to engage the depending flange of the plate 36 at the restricted section thereof and thereby limit the amount of radial movement of said plate, as clearly indicated in Fig. 3.

In operation, the child propels the velocipede in the usual manner by pedaling and in order to steer, twists or turns the seat to the side to which he wishes the velocipede to turn. This will oscillate the members by which the seat is carried and also the plate 33. The oscillation of the plate 33 in turn compels the oscillation of the gear tooth of the plate 36 and thereby the rear set of wheels as indicated by the dotted lines in Fig. 2. It will be understood that the tooth formation 39 is so designed that it will always be in firm contact with the depending flange of the member 33, the latter acting as a female tooth for the male gear tooth 39. It will be apparent that the seat may be swung to either side and thereby cause the velocipede to turn in either direction.

When it is desired to use the velocipede as a go-cart, a handle 44 is rigidly attached to the post by which the seat is supported, said handle 44 being also preferably formed of stamped metal forked at its lower end as indicated at 45 to straddle the seat post. Said handle 44 is preferably detachably held in place by the same bolts 28 which are employed for securing the seat in adjusted position. When the device is being used as a go-cart, it is advisable to retain the wheels in locked position and for this purpose, the plates 33 and 36 are provided with perforations 46 and 47 which are adapted to aline when the rear wheels are parallel with the front wheels, said perforations being adapted to receive a pin 48, thereby locking the plates 33 and 36 and preventing the rear wheels from oscillating. The go-cart thus formed may be steered in the usual manner, that is by tipping the device so as to be supported on the rear wheels only and then turned by the person pushing the same.

From the plan view shown in Fig. 2, it will be seen that the rubber tired wheels are so located as to minimize the danger of any of the other parts of the velocipede striking walls or furniture, since the wheels themselves will ordinarily come in contact with any object first. It will also be noted that the velocipede, while of light construction, is extremely strong since the bar which forms the main frame work is so arranged as to have its greatest dimension extending vertically and where the weight is directly carried from the seat, the bar is doubled upon itself thus affording still greater strength.

Although I have herein shown and described what I now consider the preferred embodiment of my invention, the same is merely illustrative and I contemplate all changes and modifications that come within the scope of the claims appended hereto.

I claim:

1. In a device of the character described, the combination with a propelling wheel unit, a steering wheel unit, and a frame work supported by said wheels, the steering wheel unit being pivoted to the frame work, of a gear tooth member rigid with respect to said steering wheel unit, a second member oscillatable about a vertical axis and pivotally attached to the frame work and coöperable with said gear tooth member, and means for oscillating said second named member to thereby change the angular position of said steering wheel unit, said means including a seat for the user also oscillatable about said axis.

2. A velocipede having wheels by which the same may be propelled and steered by the user thereof, and means for adapting said velocipede for use as a go-cart, said means including a detachable handle, and devices for retaining the steering and propelling wheels relatively locked.

3. In a velocipede of the character described, the combination with a propelling wheel unit and a steering wheel unit, of a frame work supported by said units, said frame work comprising a bar doubled upon itself for a portion of its length and having the remaining portions thereof forming a fork, said steering wheel unit being pivotally connected with the frame work where the same is doubled upon itself, a seat post supported by said frame work, a seat vertically adjustably mounted on said post, and means interposed between said seat and said steering wheel arranged to oscillate the latter upon movement of the seat.

4. In a velocipede of the character described, the combination with a frame work mounted on propelling and steering wheels, the latter being oscillatable about a vertical axis relatively to the frame work, of means for effecting said oscillation including, a stamped plate of gear tooth formation and a second stamped plate with which coöperates said gear tooth member and within which the latter fits.

5. In a device of the character described, the combination with a propelling wheel unit, a steering wheel unit, and a frame work supported by said units, of a seat oscillatably mounted with respect to said frame work, means interposed between said seat and the steering wheel unit to thereby effectuate the movements of the latter, a detachable handle for use when the device is employed as a go-cart, and means for locking the steering wheel unit rigid with respect to the frame work.

6. In a device of the character described, the combination with a propelling wheel unit and a steering wheel unit, of a framework supported by said units and comprising a bar doubled upon itself for a portion of its length and having the remaining portions thereof forked, said steering wheel unit being pivotally connected to said framework where the latter is doubled upon itself and the propelling wheel unit being connected to the forked portions of said framework.

7. In a velocipede of the character described, the combination with a propelling wheel unit and a steering wheel unit, of a framework supported by said units and comprising a bar doubled upon itself for a portion of its length and having the remaining portions thereof forked, said steering wheel unit being pivotally connected with said framework where the latter is doubled upon itself and the propelling wheel unit being connected to the forked portions of the framework, a seat supported by said framework, and means interposed between said seat and the steering wheel unit arranged to oscillate the latter upon movement of the seat.

8. In a velocipede of the character described, the combination with a framework mounted on propelling and steering wheels, the latter being located at the rear of the framework and oscillatable about a vertical axis, of a seat for the operator carried by said framework, and means interposed between said seat and steering wheels for oscillating the latter, said means including a male gear tooth and a female gear tooth both formed of stamped metal.

9. In a device of the character described, the combination with a framework, propelling wheels for supporting one end of said framework, and steering wheels pivotally connected to the framework at its opposite end and adapted to support the latter, of a seat pivotally mounted on said framework and located between the propelling and steering wheels, said seat facing the propelling wheels, and means interposed between said seat and the steering wheels for oscillating the latter upon oscillation of the seat, said seat and steering wheels oscillating about parallel axis.

In witness that I claim the foregoing I have hereunto subscribed my name this 26th day of April, 1916.

ANDREW BENSON.

Copies of this patent may be obtained for five cents each, by addressing the "Commissioner of Patents, Washington, D. C."